Patented Aug. 4, 1931

1,816,843

UNITED STATES PATENT OFFICE

PAUL HALBIG AND FELIX KAUFLER, OF MUNICH, GERMANY, ASSIGNORS TO DR. ALEXANDER WACKER GESELLSCHAFT FUR ELEKTROCHEMISCHE INDUSTRIE G. M. B. H., OF MUNICH, GERMANY

METHOD FOR PREPARING ALKALI METAL ALCOHOLATES

No Drawing. Application filed September 14, 1929, Serial No. 392,737, and in Germany November 21, 1928.

This invention relates to improvements in the production of alkali metal alcoholates and more particularly to alkali metal ethylates.

Heretofore these alcoholates have been made generally by reacting metallic sodium or potassium with anhydrous alcohols but the high cost of the metals has led to the development of processes whereby alkali metal hydroxides have been substituted for the alkali metal.

In processes using alkali metal hydroxides the water formed by the reaction must be eliminated. This has been accomplished by heating the alcoholic solutions with calcium carbide which absorbs the water. The great objection to this expedient is that it leaves hydrate of lime in the final reaction mixture. To purify the reaction mixture requires a separate, troublesome and expensive process.

A second method of eliminating the water from the reaction mixture is to use a great excess of the alcohol and distil it off. The alcohol vapors distilled off contain a small amount of water vapor but this method is open to objection due to the large volume of alcohol which must be distilled off to get rid of the water. The heat expenditure in vaporizing the alcohol is excessive. A modification of this method is to add to the reaction mixture an auxiliary inert liquid, such as benzol. (Walker, Journ. Soc. Chem. Ind. Vol. XXXX, page 172 (1921)) and then distil this liquid off. This method is slightly more efficient with respect to heat economy but is still far from satisfactory as the water vapor content in the distilled vapors is still extremely low.

It has now been discovered that the preparation of alkali metal alcoholates by means of alkali metal hydroxides can be carried out much more quickly and economically if a temperature materially above the boiling point of the alcohol is used. In the case of ethyl alcohol, the temperature should be above 100° C. The reaction and distillation of the excess alcohol vapors and water may be maintained at these elevated temperatures by putting the apparatus under pressure greater than atmospheric pressure or by passing alcohol vapors through a high boiling oil in which an alkali metal hydroxide is suspended. Other methods of effecting the same result will be obvious to those skilled in the art. Where the distillation temperature is to be raised solely by pressure, a pressure of at least 2—3 atmospheres should be used when making ethylates. Such a pressure raises the distillation temperature to at least 100° C. In the same manner the alkali metal alcoholates of other alcohols are manufactured e. g. of iso-propylalcohol, of n-butylalcohol etc.

To illustrate the invention more clearly and to show the advantages in heat economy effected thereby, the following specific examples are given:

Example 1. Finely divided sodium hydroxide is suspended in two and a half times its weight of a paraffin oil boiling above 320° C. Anhydrous ethyl alcohol vapor was led through this suspension while the temperature was kept at 200° C. The alcohol vapor distilled off had a water content of 2.5%, the sodium ethylate being left in the residue.

By way of comparison the alcohol vapor was passed through the same suspension at a temperature approximately that of the boiling point of ethyl alcohol. The alcohol vapor in this case contained only .4% water, all conditions being the same except the temperature. By increasing the temperature the water content of the alcohol vapors being carried off was increased over 600%.

Example 2. A solution of one part of sodium hydroxide in ten parts anhydrous alcohol was placed in distilling apparatus provided with a column and dephlegmator. The apparatus was placed under pressure of ten atmospheres and the alcohol vapor distilled off. A temperature of 150° C. being required to distil it at this pressure. The alcohol vapor in this case contained 1.75% water.

To again demonstrate the difference that the distillation temperature makes the pressure was relieved from the apparatus and the alcohol vapor again distilled over, this time at atmospheric pressure. The alcohol vapor contained .7% water. An increase of approximately 250% in water content of the alcohol vapor is caused by carrying out the distillation under pressure.

Example 3. One part sodium hydroxide, ten parts of ethyl alcohol and 6.5 parts of benzene were placed in distilling apparatus as in Example 2. The apparatus was placed under a pressure of seven atmospheres and it was found that 370 calories of heat were necessary to distill off 90% of the water formed by the reaction for each gram-molecule of sodium hydroxide.

The distillation was then carried out at atmospheric pressure and it was found that it required 1100 calories of heat to distill of 90% of the water formed by the reaction for each gram-molecule of sodium hydroxide. By increasing the presure a 300% economy in heat consumption was effected.

Beside benzene, its homologues and hydrocarbons such as hexane may be used as an auxiliary liquid. The auxiliary liquid should be inert and capable of forming azeotropic mixtures with water, alcohol, or both.

Example 4. The process described in Example 3 was carried out using the equivalent amount of potassium hydroxide instead of sodium hydroxide. The results were substantialy the same.

The invention claimed is:

1. Method of preparing alkali metal alcoholates from alkali metal hydroxides, comprising reacting an alkali metal hydroxide with an excess of an alcohol and distilling off the water formed by the reaction and the excess alcohol at a temperature materially above the atmospheric boiling point of said alcohol.

2. Method of preparing alkali metal alcoholates from alkali metal hydroxides, comprising reacting an alkali metal hydroxide with an excess of an alcohol and distilling off the water formed by the reaction and the excess alcohol at a pressure great enough to raise the temperature at which the water and excess alcohol distill off, materially above the atmospheric boiling point of said alcohol.

3. Method of preparing alkali metal ethylates from alkali metal hydroxides, comprising reacting an alkali metal hydroxide with an excess of ethyl alcohol and distilling off the water formed by the reaction and the excess alcohol at a temperature materially above the atmospheric boiling point of ethyl alcohol.

4. Method of preparing alkali metal ethylates from alkali metal hydroxides, comprising reacting an alkali metal hydroxide with an excess of ethyl alcohol at a temperature materially above the atmospheric boiling point of ethyl alcohol and distilling off the water formed by the reaction and the excess alcohol while maintaining that temperature.

5. Method of preparing alkali metal ethylates from alkali metal hydroxides, comprising reacting alkali metal hydroxides with an excess of ethyl alcohol and distilling off the water formed by the reaction and the excess alcohol at a temperature above 100 degrees C.

6. Method of preparing alkali metal ethylates from alkali metal hydroxides, comprising reacting an alkali metal hydroxide with an exces of ethyl alcohol and distilling off the water formed by the reaction and the excess alcohol at a pressure of at least two atmospheres.

7. Method of preparing alkali metal ethylates from alkali metal hydroxides, comprising reacting an alkali metal hydroxide with an excess of ethyl alcohol and distilling off the water formed by the reaction and the excess alcohol at a pressure of seven atmospheres.

8. Method of preparing alkali metal ethylates from alkali metal hydroxides, comprising reacting an alkali metal hydroxide with an excess of ethyl alcohol in the presence of an inert liquid capable of forming an azeotropic mixture with water and distilling off the water formed by the reaction, the excess alcohol and the inert liquid at a temperature above 100 degrees C.

9. Method of preparing alkali metal alcoholates comprising suspending an alkali metal hydroxide in a high boiling point oil and passing an excess of an alcohol vapor through said oil held at a temperature materially above the atmospheric boiling point of said alcohol.

10. Method of preparing alkali metal ethylates comprising suspending an alkali metal hydroxide in a high boiling point oil and passing an excess of ethyl alcohol vapor through said oil held at a temperature materially above the atmospheric boiling point of ethyl alcohol.

Signed at Munich in the country of Germany and State of Bavaria this 3rd day of September A. D., 1929.

Dr. PAUL HALBIG.
Dr. FELIX KAUFLER.